United States Patent
Song et al.

(10) Patent No.: US 9,243,611 B2
(45) Date of Patent: Jan. 26, 2016

(54) VERTICAL AXIS WIND TURBINE BLADE AND ITS WIND ROTOR

(76) Inventors: Hanjun Song, Beijing (CN); Yun Liu, New York, NY (US); Nicolas Blitterswyk, New York, NY (US)

( * ) Notice: Subject to any disclaimer, the term of this patent is extended or adjusted under 35 U.S.C. 154(b) by 675 days.

(21) Appl. No.: 13/496,887

(22) PCT Filed: Jun. 24, 2010

(86) PCT No.: PCT/IB2010/001527
§ 371 (c)(1),
(2), (4) Date: Mar. 19, 2012

(87) PCT Pub. No.: WO2011/033348
PCT Pub. Date: Mar. 24, 2011

(65) Prior Publication Data
US 2012/0201687 A1    Aug. 9, 2012

(30) Foreign Application Priority Data

Sep. 18, 2009    (CN) ...................... 2009 2 0216540 U

(51) Int. Cl.
F03D 3/06    (2006.01)

(52) U.S. Cl.
CPC ........... F03D 3/061 (2013.01); *F05B 2240/214* (2013.01); *F05B 2250/25* (2013.01); *Y02E 10/74* (2013.01)

(58) Field of Classification Search
CPC ... F03D 3/005; F03D 3/065; F05B 2240/211; F05B 2240/212; F05B 2240/213; F05B 2240/214

USPC ......... 415/4.2, 4.4; 416/227 R, 227 A, 231 R, 416/210 R, 211
See application file for complete search history.

(56) References Cited

U.S. PATENT DOCUMENTS

| | | | |
|---|---|---|---|
| 2,106,928 A * | 2/1938 | Lee ............................... | 416/178 |
| 3,918,839 A | 11/1975 | Blackwell | |
| 4,255,085 A | 3/1981 | Evans | |
| 4,285,636 A | 8/1981 | Kato | |
| 4,293,279 A * | 10/1981 | Bolie ......................... | 416/227 A |
| 4,415,312 A | 11/1983 | Brenneman | |
| 4,430,044 A | 2/1984 | Liljegren | |
| 4,491,739 A * | 1/1985 | Watson ........................... | 290/44 |

(Continued)

FOREIGN PATENT DOCUMENTS

| | | |
|---|---|---|
| CA | 1098042 A1 | 3/1981 |
| CA | 2309850 A1 | 11/2001 |

(Continued)

OTHER PUBLICATIONS

International Preliminary Report on Patentability, dated Jan. 23, 2012 for related application No. PCT/IB2010/001527 filed Jun. 24, 2010.

(Continued)

*Primary Examiner* — Christopher Verdier
*Assistant Examiner* — Aaron R Eastman
(74) *Attorney, Agent, or Firm* — Cheryl H. Agris; Agris & von Natzmer, LLP

(57) ABSTRACT

A vertical axis wind turbine comprising blade(s) characterized in an airfoil cross section, wherein the top end and the bottom end of said blade(s) are rotationally off-set from each other, twisted up with a vertical line vertical to the horizontal plane.

8 Claims, 7 Drawing Sheets

(56) References Cited

U.S. PATENT DOCUMENTS

| | | | |
|---|---|---|---|
| 4,764,090 A | | 8/1988 | Danson |
| 5,405,246 A | * | 4/1995 | Goldberg .................. 416/227 A |
| 6,036,443 A | | 3/2000 | Gorlov |
| 6,320,273 B1 | | 11/2001 | Nemec |
| 7,156,609 B2 | * | 1/2007 | Palley ............................ 415/4.2 |
| 8,013,464 B2 | | 9/2011 | Stern |
| 2001/0001299 A1 | | 5/2001 | Gorlov |
| 2005/0248160 A1 | | 11/2005 | Watkins |
| 2006/0078416 A1 | | 4/2006 | Haworth |
| 2006/0275105 A1 | * | 12/2006 | Roberts et al. ................. 415/4.2 |
| 2007/0224029 A1 | | 9/2007 | Yokoi |
| 2008/0008588 A1 | | 1/2008 | Hartman |
| 2008/0152492 A1 | * | 6/2008 | Fein et al. ......................... 416/9 |
| 2009/0102194 A1 | | 4/2009 | San Miguel |
| 2009/0194997 A1 | * | 8/2009 | Stabins ........................... 290/54 |
| 2009/0317255 A1 | | 12/2009 | Bertony |
| 2010/0054936 A1 | | 3/2010 | Sneeringer |
| 2010/0066094 A1 | | 3/2010 | Bernhoff |
| 2010/0086406 A1 | | 4/2010 | Schaap |
| 2011/0280708 A1 | | 11/2011 | Cochrane |

FOREIGN PATENT DOCUMENTS

| | | |
|---|---|---|
| CN | 1213042 A | 4/1999 |
| CN | 101368539 A | 2/2009 |
| CN | 101532471 A | 9/2009 |
| CN | 101576062 B | 11/2009 |
| CN | 201344102 Y | 11/2009 |
| CN | 101603508 A | 12/2009 |
| CN | 201369653 Y | 12/2009 |
| CN | 101532471 A | 3/2012 |
| DE | 3629872 A1 | 3/1988 |
| DE | 4005685 A1 | 12/1991 |
| DE | 4006256 A1 | 2/1992 |
| DE | 19516504 A1 | 11/1996 |
| DE | 10010792 A1 | 9/2001 |
| DE | 102006044222 A1 | 3/2008 |
| EP | 0775823 A2 | 5/1997 |
| EP | 2128434 A2 | 12/2009 |
| EP | 2163760 A1 | 3/2010 |
| EP | 2169216 A2 | 3/2010 |
| EP | 2169217 A2 | 3/2010 |
| EP | 2169219 A2 | 3/2010 |
| EP | 2175132 A1 | 4/2010 |
| GB | 2386925 A | 10/2003 |
| GB | 2451670 A | 2/2009 |
| GB | 2460476 A | 12/2009 |
| GB | 2460526 A | 12/2009 |
| GB | 2461711 A | 1/2010 |
| JP | 60090992 A | 5/1985 |
| JP | 61093279 A | 5/1986 |
| KR | 100916701 B1 | 9/2009 |
| KR | 101181596 B1 | 3/2011 |
| KR | 101181596 B1 | 8/2012 |
| WO | 2005001035 A1 | 2/2005 |
| WO | 2005010355 A1 | 2/2005 |
| WO | 2008141763 A2 | 11/2008 |
| WO | 2008141813 A2 | 11/2008 |
| WO | 2009072116 A2 | 6/2009 |
| WO | 2009096739 A3 | 8/2009 |
| WO | 2009105835 A1 | 9/2009 |
| WO | 2009130691 A2 | 10/2009 |
| WO | 2009151359 A1 | 12/2009 |
| WO | 2010001141 A2 | 1/2010 |
| WO | 2010031200 A1 | 3/2010 |
| WO | 2010150083 A2 | 12/2010 |
| WO | 2010150084 A2 | 12/2010 |
| WO | 2011087732 A1 | 7/2011 |
| WO | 2014179631 A1 | 11/2014 |

OTHER PUBLICATIONS

Written Opinion of International Searching Authority, dated Dec. 1, 2011, for related application No. PCT/IB2010/001527 filed Jun. 24, 2010.
Written Opinion of International Searching Authority, dated Jun. 7, 2011, for related application No. PCT/IB2010/001527 filed Jun. 24, 2010.
International Search Report dated Jun. 7, 2011.
International Search Report and Written Opinion, dated May 27, 2011, for related application No. PCT/IB2010/001523 filed Jun. 24, 2010.
Office Action dated Apr. 25, 2013 for related U.S. Appl. No. 13/380,733.
Office Action dated Oct. 13, 2013 for related U.S. Appl. No. 13/380,733.
Interview Summary dated Feb. 5, 2014 for related U.S. Appl. No. 13/380,733.
Interview Summary dated Mar. 5, 2014 for related U.S. Appl. No. 13/380,733.
Berg, D. "Structural Design of the Sandia 34-Meter Vertical-Axis Wind Turbine" Sandia Report SAND84-1287, printed Apr. 1985.
Ashwill, T., "Measured Data for the Sandia 34-Meter Vertical Axis Wind Turbine" Sandia Report SAND91-222, printed Jul. 1992.
US Office Action dated Sep. 8, 2014 for related U.S. Appl. No. 13/380,733.
US Office Action dated Aug. 4, 2014 for related U.S. Appl. No. 13/380,793.
Civil Action No. CV14-3653, filed May 13, 2014 in the US District Court, Central District of California.
US Office Ation dated Oct. 13, 2013 for related U.S. Appl. No. 13/380,733.
US Office Action dated Apr. 25, 2013 for related U.S. Appl. No. 13/380,733.
International Preliminary Report on Patentability, dated Jan. 18, 2012 for related application No. PCT/IB2010/001523 filed Jun. 24, 2010.
International Preliminary Report on Patentability, dated Dec. 11, 2011, for related application No. PCT/IB2010/001524 filed Jun. 24, 2010.
International Search Report and Written Opinion, dated Jun. 7, 2011, for related application No. PCT/IB2010/001524 filed Jun. 24, 2010.
Office Action dated Mar. 13, 2015 for related U.S. Appl. No. 13/380,793.
Interview Summary dated Aug. 6, 2015 for related U.S. Appl. No. 13/380,793.

* cited by examiner

VERTICAL AXIS WIND TURBINE BLADE AND ITS WIND ROTOR

TECHNICAL FIELD

The present invention relates to the structure of a vertical axis wind turbine (VAWT) blade and its wind rotor in the wind power generation field. In particular, this invention relates to the structure of the VAWT blade and its wind rotor.

BACKGROUND ART

At present, the wind rotor of a VAWT has the capability to compete with a horizontal axis three-blade wind rotor on efficiency. However, the wind rotor of the VAWT is hard to be started up without the help of external force. This has brought difficulty to the prevalence of this type of wind turbine.

VAWTs have an advantage over horizontal-axis wind turbines in that they do not need to be orientated into the prevailing wind direction. VAWTs are able to produce a rotational movement irrespective of the wind direction.

The blades can be subject to very high stresses. This is due to the centrifugal forces produced on rotation of the turbine at high rotational speeds. The noise levels can reach unacceptable grades, produced by large vortices shed at the blade tips, rotation of the turbine at high rotational speeds. As the blades alternate between crossing the wind direction and coasting, uneven torque may be produced from the lifting surfaces of VAWTs.

WO2005010355 discloses a VAWT comprising a shaft rotatable about a longitudinal axis and a plurality of substantially rigid blades mechanically coupled to the shaft, each of the plurality of blades comprising an elongate body having an upper end and a lower end, wherein the upper end and the lower end of each blade are rotationally off-set from each other about the longitudinal axis such that each blade has a helix-like form, the section of the elongate body of each blade, taken perpendicularly to the longitudinal axis, being shaped as an aerofoil having a leading edge and a trailing edge and a camber line defined between the leading edge and the trailing edge, characterised in that the aerofoil is accurately shaped such that the camber line lies along a line of constant curvature having a finite radius of curvature.

WO2009151359 discloses a wind turbine with vertical axis and having a plurality of axial extending turbine blades where the structure of each blade varies along the axial extension of the blade.

DEFINITIONS

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

It must be noted that as used herein and in the appended claims, the singular forms "a," "and" and "the" include plural references unless the context clearly dictates otherwise.

SUMMARY OF THE INVENTION

Provided herein is a wind blade and wind rotor of a VAWT started up by breeze wind.

The VAWT comprises a blade. The blade(s) may be twisted up with a vertical line wherein said vertical line is vertical to a horizontal plane, to rotationally offset the top end and bottom end of the blade. The distances between the mentioned vertical line and the midpoint of the chord between leading edge and tailing edge of a series of airfoil cross sections of the mentioned blade may be the same or may vary (e.g., between 5 cm and 500 cm).

The VAWT may further comprise the wind rotor of the VAWT blade(s), connecting arm(s) the connecting arm(s) may be or may not be airfoil shaped, and the rotor shaft. Both ends of the mentioned connecting arm(s) may be connected with the mentioned blade and the rotor shaft respectively. Secured with the connecting arm(s), the blade(s) may be twisted up with a vertical line wherein said vertical line is vertical to the horizontal plane, to rotationally offset the top end and bottom end of the blade and the distances between the mentioned vertical line and the midpoint of the chord between leading edge and tailing edge of a series of airfoil cross section of the mentioned blade are the same. The line intersectant with the mentioned vertical line and midpoint of the mentioned chord in the same plane may form a set angle with the mentioned chord, wherein, the first line and the second line may form a set angle, and the mentioned first line may be the one intersectant with the mentioned vertical line and the midpoint of the chord at the top most airfoil cross section(s) of the mentioned blade, while the second line may be the one intersectant with the mentioned vertical line and the midpoint of the chord at the bottom most airfoil cross section of the mentioned blade.

Preferably, the mentioned wind rotor may be equipped with two or more blades and the vertical projection of the mentioned two or more blades may form a closed circle. More preferably, the mentioned wind rotor may be equipped with three blades, and the vertical projection of the mentioned three blades may form a closed circle.

The distance between the chord midpoint of the mentioned airfoil cross section to the mentioned vertical line may be the same as the length of the mentioned connecting arm width. The mentioned vertical line may be superposed with the axis of the mentioned rotor shaft, and the length of the mentioned rotor shaft may be less than or equal to the vertical distance between the top most airfoil cross section to the bottom most airfoil sectional circle in the mentioned blade.

In an alternative embodiment, the length of the mentioned rotor shaft may be more than or equal to the vertical distance between the top most airfoil cross section to the bottom most airfoil sectional circle in the mentioned blade.

The distance between the chord midpoint of the mentioned airfoil cross section to the mentioned vertical line may be the same as the length of the mentioned connecting arm airfoil. The mentioned vertical line may be superposed with the axis of the mentioned rotor shaft, and the length of the mentioned rotor shaft may be less than or equal to the vertical distance between the top most airfoil cross section to the bottom most airfoil sectional circle in the mentioned blade.

The mentioned line intersectant with the mentioned vertical line and midpoint of the mentioned chord in the same plane may form an angle of between about 30° to about 150° with the mentioned chord, wherein, the first line and the second line may form an angle of from about 50° to about 200°.

Preferably the mentioned line intersectant with the mentioned vertical line and midpoint of the mentioned chord in the same plane may form an angle of between about 70° to about 110° with the mentioned chord, wherein, the first line and the second line may form an angle of from about 80° to about 150°.

More preferably the mentioned line intersectant with the mentioned vertical line and midpoint of the mentioned chord in the same plane may form an angle of about 96°±1° with the mentioned chord, wherein, the first line and the second line may form an angle of about 120°.

Preferably said vertical line is super-positioned with the axis of the rotor shaft.

The mentioned blade may comprise an airfoil measurement of about FX63-137.

The mentioned blade may comprise an anti-symmetric airfoil with a high Lift/Drag ratio.

The mentioned blade(s) may form an outer concave and/or convex surface with respect to the central rotor shaft. Preferably the mentioned blade(s) forms an outer concave surface with respect to the central rotor shaft.

The distance from the bottom of the airfoil blade section to the point of the connecting arms attachment may be any distance along the length of the blade. Preferably the distance from the bottom of the airfoil blade section to the point of the connecting arm(s) attachment may be no more than about 1000 mm and in particular, between about 1000 mm and about 0.1 mm. More preferably the distance from the bottom of the airfoil blade section to the point of the connecting arm(s) attachment may be between about 800 mm and about 250 mm. Even more preferably the distance from the bottom of the airfoil blade section to the point of the connecting arm(s) attachment may be between about 760 mm and about 300 mm. Most preferably the distance from the bottom of the airfoil blade section to the point of the connecting arm(s) attachment may be about 753.5 mm, 490 mm or 305 mm.

The distance from the top of the airfoil blade section to the point of the connecting arm(s) attachment may be any distance along the length of the blade. Preferably the distance from the top of the airfoil blade section to the point of the connecting arm(s) attachment may be no more than about 1000 mm and in particular, between about 1000 mm and about 0.1 mm. More preferably the distance from the top of the airfoil blade section to the point of the connecting arm(s) attachment may be between about 800 mm and about 250 mm. Even more preferably the distance from the top of the airfoil blade section to the point of the connecting arm(s) attachment may be between about 770 mm and about 300 mm. Most preferably the distance from the top of the airfoil blade section to the point of the connecting arm(s) attachment may be about 766.5 mm, 490 mm or 305 mm.

The blade(s) may comprise for example a mixture of any one of the following; fibre glass or carbon fiber with epoxide resin, high strength glass, plastic, foam and/or metal. In an alternative embodiment, the blade(s) may have a secure material inside the length of the blade. The secure material may or may not be attached to the inside of the blade. The secure material may extrude outside of the blade, or be accessible from outside of the blade, at a point where the blade attaches to the connecting arm. At said point where the blade attaches to the connecting arm, the secure material may form a loop. Said blade loop may attach to a loop, extruding from the connecting arm through the connecting arm attachment piece, or located inside the connecting arm or attachment piece. Said connecting arm loop may be formed from secure material extending either the length of the connecting arm or no more than the length of the connecting arm. The loop from the blade and the loop from the connecting arm may be securely attachable to each other.

Alternatively, the secure material may exist in a loop through a lower connecting arm through the generator shaft, through the upper connecting arm and through the blade so as to form a closed loop. The secure material may comprise but is not limited to either one or more of rope, chain, metal, wire, string, nylon, rubber and or plastic.

In accordance with the above mentioned VAWT, the wind rotor is connected to the VAWT blade with above mentioned structure, along the vertical axis direction, the blade is twisted up from the bottom, and oblique torque will be produced at all windage of the blade when air comes from various directions, therefore, the wind rotor may self-start up and rotate with low wind speed. The twisted structure of the blade provides an area of surface, at substantially every angle. The blade design is such that wind, from substantially every direction, may be caught by the wind blade, forcing movement of the blade. Furthermore the blade design of the present invention provides a levelling of pulsating wind, hence lowering vibration. With implication of an alternative embodiment the above mentioned VAWT provides a safety feature to ensure the blades cannot become fully separated from the other parts of the VAWT.

DETAILED DESCRIPTION OF SPECIFIC EMBODIMENTS

Hereunder the present invention may be given further description on the mode of carrying out the invention with incorporation of the attached figures, wherein, the attached figures are only for reference and description assistance, which are not proportion or an accurate layout. Therefore, the actual mode of carrying-out the present invention may not be restricted by the proportion and layout relation indicated in the attached figures.

Provided herein is a VAWT blade, with the airfoil cross section, the mentioned blade may be twisted up along a vertical line, vertical to a horizontal plane, and the distances between the mentioned vertical line and chord midpoint of leading edge and tailing edge of a series of airfoil cross sections of the mentioned blade may be the same. Moreover, the line intersectant with the mentioned vertical line and the mentioned chord midpoint in the same plane may form an angle of 96°±1° with the mentioned chord, wherein, the first line and the second line may form an angle of 120°. The mentioned first line may be the one intersectant with the mentioned vertical line and chord midpoint at the top most airfoil cross section of the mentioned blade, and the mentioned second line may be the one intersectant with the mentioned vertical line and chord midpoint at the bottom most airfoil cross section of the mentioned blade.

Figure 1:
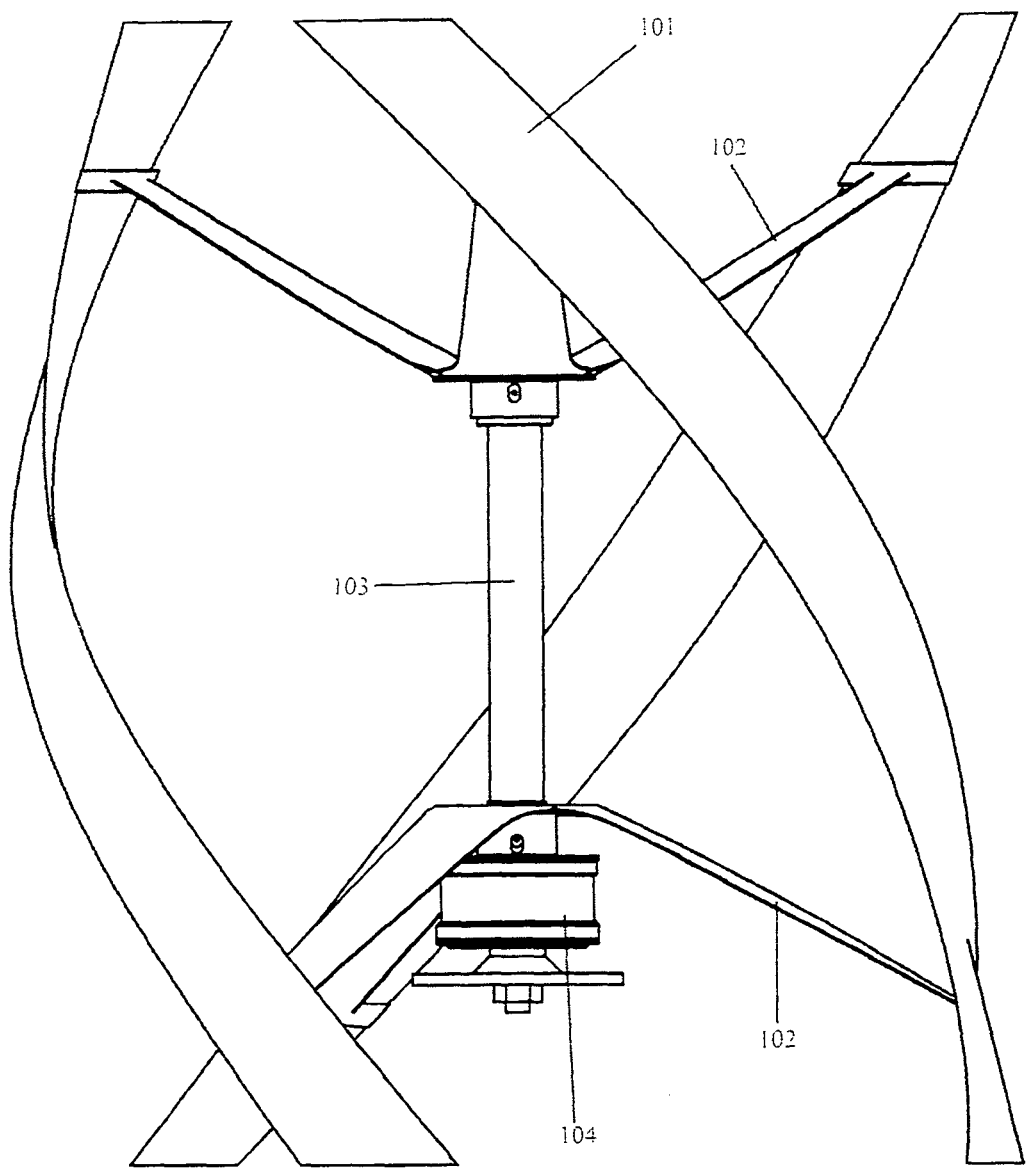
FIG. 1 is a schematic illustration of the wind rotor of the VAWT and the complete appliance provided by the present invention.
Figure 4:
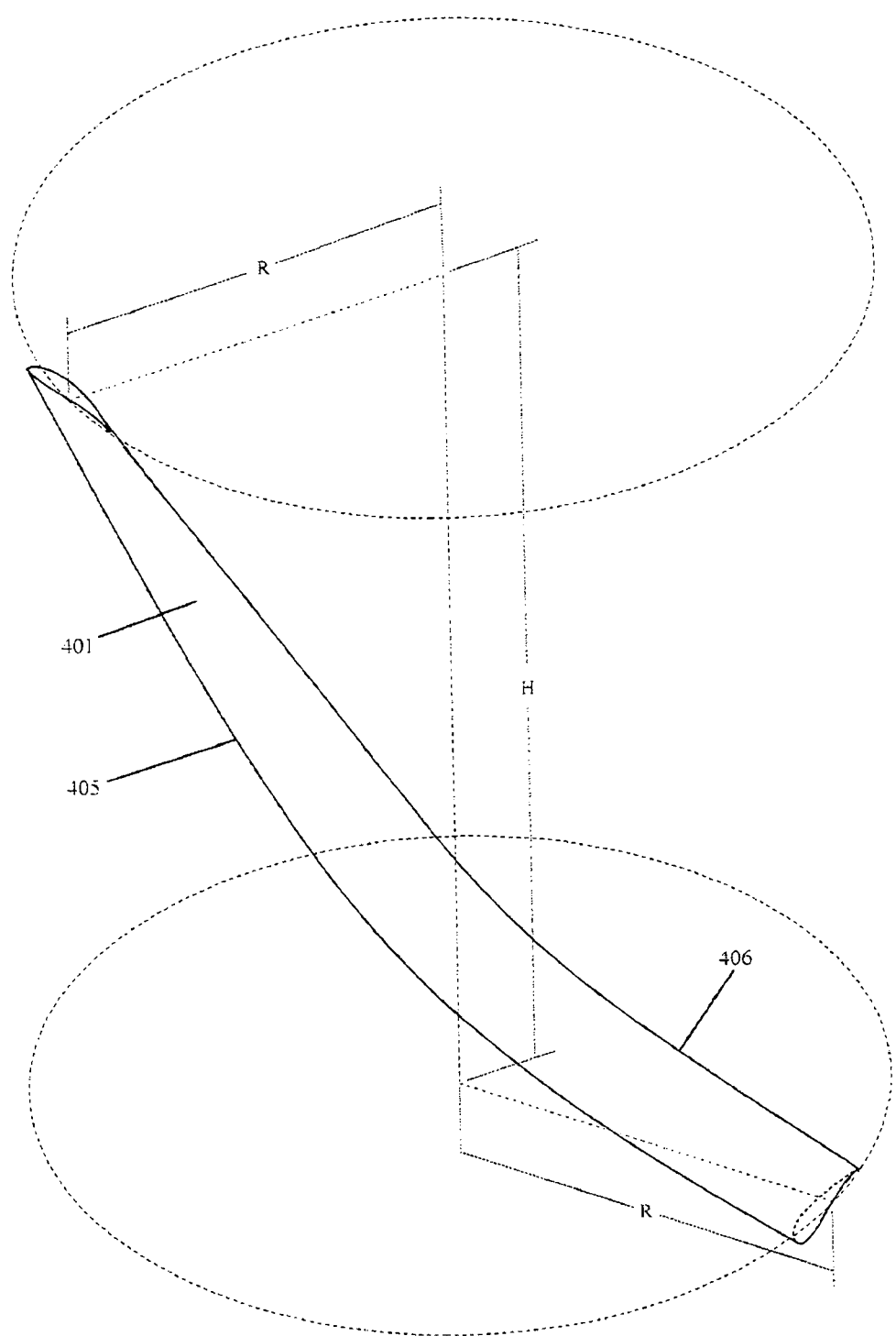
FIG. 4 is a schematic illustration which indicates the vertical distance between upper sectional circle and lower sectional circle of wind blade and the airfoil of the wind blade provided by the present invention.
Figure 5:
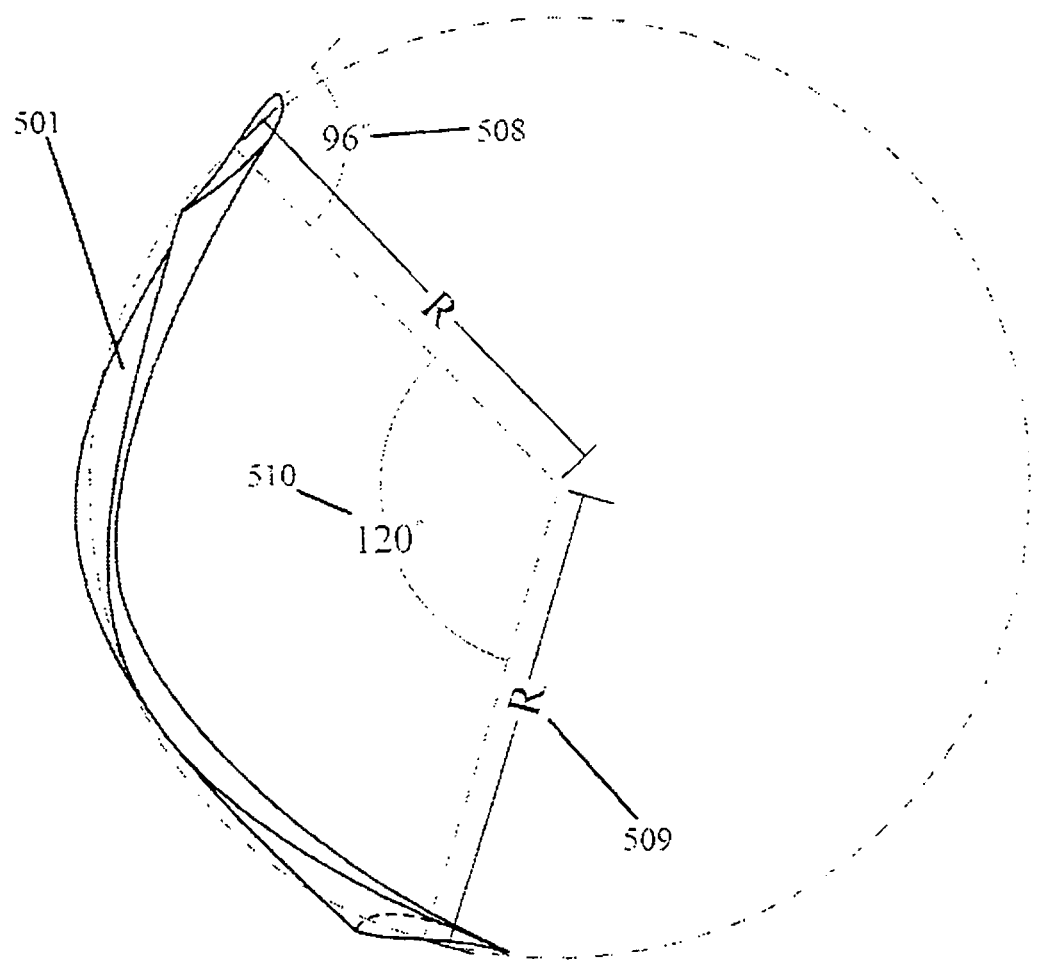
FIG. 5 is a schematic illustration of the wind blade and the present invention relating to the wind blade.

According to FIG. 1, FIG. 4 and FIG. 5, applying the above-mentioned blade into the wind rotor of the vertical axis wind turbine, the wind rotor may comprise blade 101, connecting arm flat or airfoil 102 and rotor shaft 103, and both ends of the connecting arm flat or airfoil 102 may be connected with the blade 101 and rotor shaft 103 respectively. Moreover, the complete appliance of the VAWT may include generator 104, wherein, with airfoil cross section, the blade 101 may be twisted up along a vertical line, vertical to horizontal plane. The distances between the mentioned vertical line and chord midpoint of the leading edge 405 and tailing edge 406 of a series of airfoil cross sections of the mentioned blade may be the same, and the line intersectant with the mentioned vertical line and the mentioned chord midpoint in the same plane may form and angle of 96°±1° 508 with the mentioned chord, wherein, the first line and the second line may form an angle of 120° 510. The mentioned first line may be the one intersectant with the mentioned vertical line and chord midpoint at top most airfoil cross section of the mentioned blade, and the mentioned second line may be the one intersectant with the mentioned vertical line and chord midpoint at bottom airfoil cross section of the mentioned blade.

Figure 2:
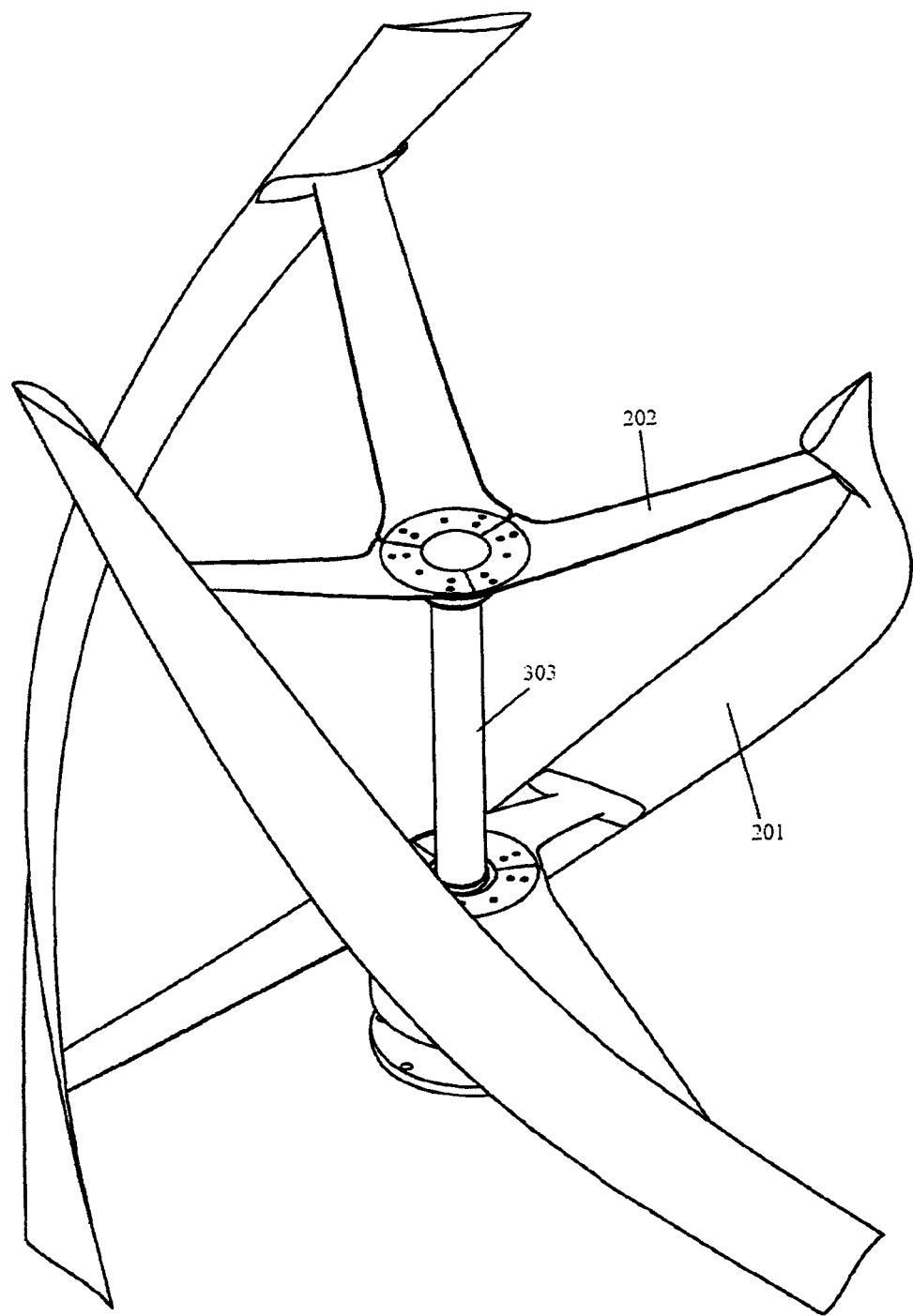
FIG. 2 is a schematic illustration of the vertical axis wind turbine of the present invention.
Figure 3:
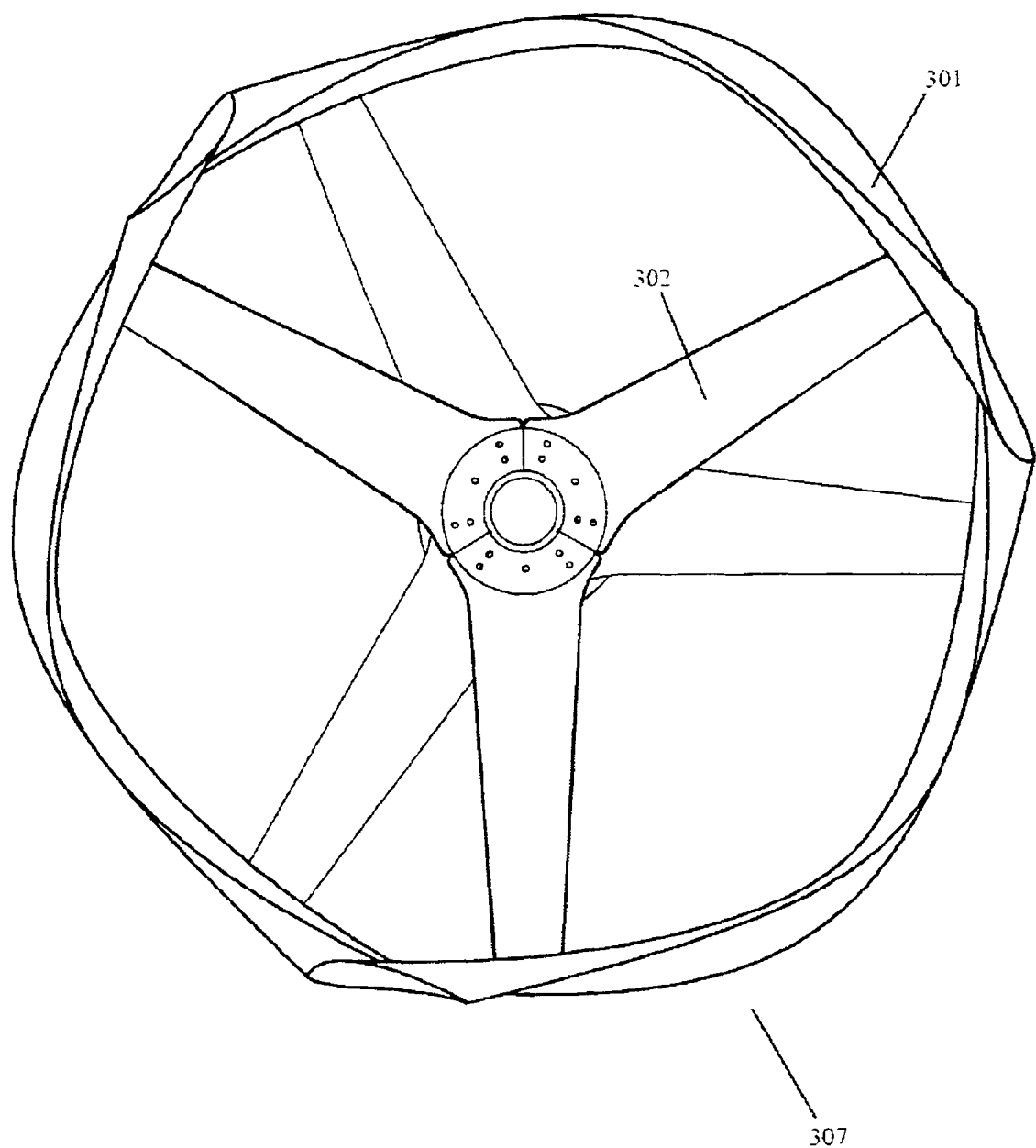
FIG. 3 is a schematic illustration, from a top down perspective, of a group of upper and a group of lower connecting arms and three blades.

During the fabrication and erection process of the blade, the distance between the chord midpoint of the airfoil cross section and vertical line may be set to be equal to the length of connecting arm usually, and the vertical line may be set to be superposition with axis of wheel axle. Such setup can decrease the drag torque of the blade, during operation, effectively. Preferably, three blades may be equipped for the wind rotor (as per FIG. 1, FIG. 2 and FIG. 3), and the vertical projection of the three blades may form a closed circle 307, so that wind from various directions may produce stronger oblique torque on windage of blade, and wind power can be utilized more efficiently to enhance the wind rotor self-start and rotation with low wind speed.

Based on for example FX63-137 airfoil or an anti-symmetric airfoil with high Lift/Drag ratio, the above-mentioned blade can be fabricated by methods as below.

With reference to FIG. 1, FIG. 2, FIG. 3, FIG. 4 and FIG. 5 a line segment L may be led from chord midpoint of leading edge and tailing edge of airfoil FX63-137, or an anti-symmetric airfoil with high lift/drag ration which forms an angle of 96°±1° 508 with the mentioned chord. Preferably the length R 509 of the line segment L may be set as the length of the connecting arm flat or airfoil 102 of the wind rotor (the length is called radius of wind rotor usually under such condition). A vertical line may be made to connect the terminal point of the mentioned line segment L and be vertical to the plane, in which the terminal point of line segment L may be the one to connect with the chord midpoint of the leading edge 405 and the tailing edge 406 of the airfoil cross section. The distance between the vertical line and the chord midpoint of the leading edge and the tailing edge of the airfoil cross section may be R, and preferably the vertical line may be setup to be superposed with the axis of the rotor shaft 103.

Taking the vertical line as axis, the airfoil blade 101 may be twisted up with constant speed around the vertical line. During twirling process, the angle of 90°±1° 508 formed by line segment L and chord between leading edge 405 and tailing edge 406, and the distance L between the chord midpoint and the vertical line may be kept unchanged. The blade 101 can be formed after 120° 510 horizontal rotation. The vertical twirling height i.e. the vertical distance between the top most cross section and the bottom sectional circle of the blade may be as per FIG. 1, FIG. 2 and FIG. 3, which may be longer than or equal to the length of rotor shaft.

Figure 6:
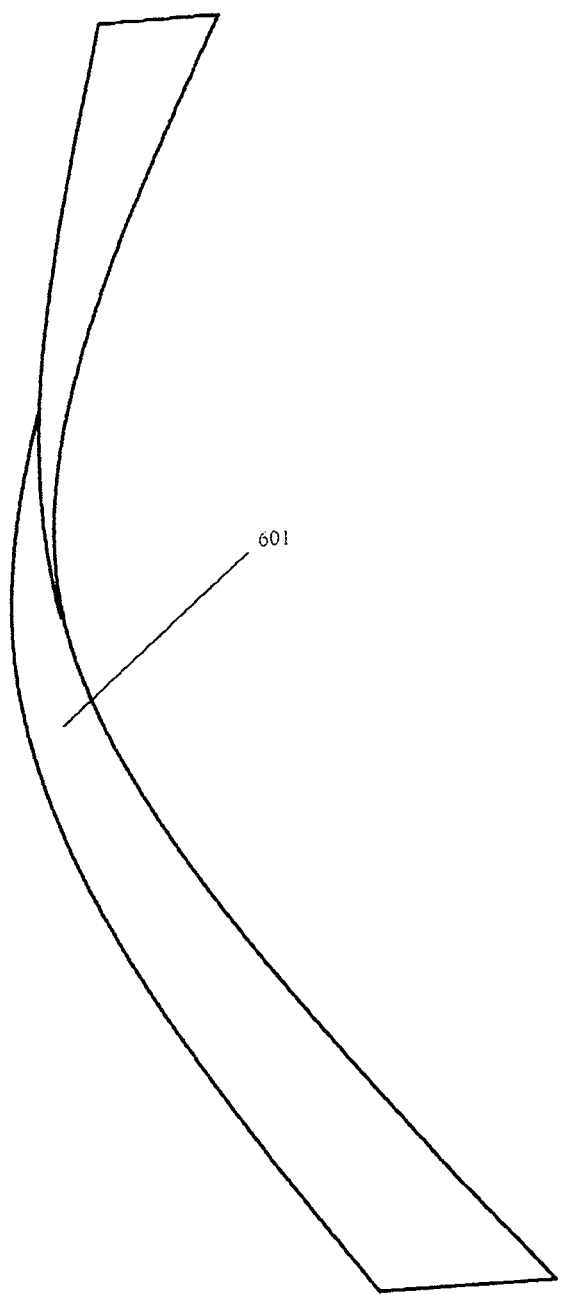
FIG. 6 is a schematic illustration, from a side perspective, of the wind blade.
Figure 7:
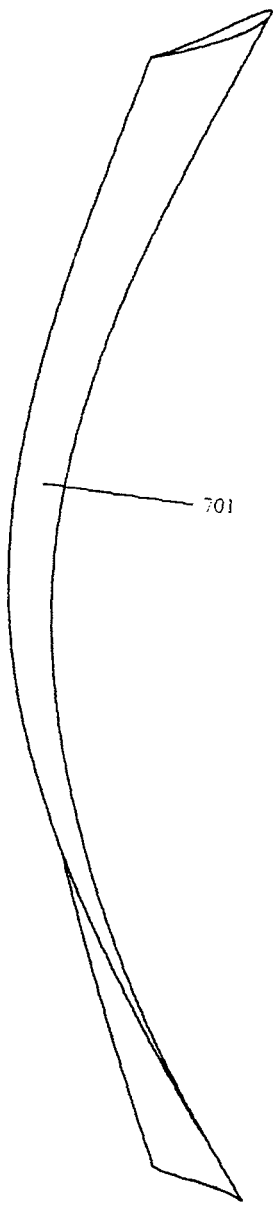
FIG. 7 is a schematic illustration, from a side perspective, of the wind blade.

With reference to FIG. 4, FIG. 6 and FIG. 7 the blade 401, 601, 701 of the VAWT with above-mentioned structure made as per above-mentioned method, and the wind rotor connected to the VAWT blade with the adoption of above-mentioned structure, the blade 401, 601, 701 forms a twisted structure from bottom to top along the vertical axle direction. The windage of blade may produce oblique torque when wind comes from various directions, therefore, the wind rotor can be started up and twirled automatically with low wind speed.

The above-mentioned is only the preferred embodiment of the present invention, however, since this present invention may be structurally modified in various forms by those skilled in the art, while its utilities remained unchanged, the extent of protection of the present invention may be subject to the protection domain stipulated by Claims.

What is claimed is:

1. A vertical axis wind turbine comprising
   (a) a wind rotor which comprises two or more helical wind blades swept up and about an axis of rotation, vertical to a horizontal plane with a top end and bottom end of blade(s) rotationally offset from each other, wherein said blade(s) has an airfoil cross section(s) and said airfoil cross section(s) have chords, wherein: (i) a first line which is in the plane of the top most airfoil cross-section intersects with the axis of rotation and midpoint of a chord of the top most airfoil cross section of said wind blade and forms an angle between 91° to 150°, with the chord; (ii) a second line which is in the plane of the bottom most airfoil cross section intersects with the axis of rotation and the midpoint of the chord at the bottom most airfoil cross section of the blade and forms an angle between 91° to 150°, with the chord; (iii) vertical projections of said first line and second line form an angle of between 50° to 200° and (iv) vertical projections of said blades form a closed circle and
   (b) connecting arms connected with said blade(s) and rotor shaft respectively.

2. The vertical axis wind turbine according to claim 1, wherein the distance between the vertical line and the midpoint of the chord between the leading edge and the tailing edge of series of airfoil cross sections of the blade between 5 cm and 500 cm.

3. The vertical axis wind turbine according to claim 1, wherein said blade(s) are FX63-137 airfoil.

4. The vertical axis wind turbine according to claim 1, wherein said blade(s) form an outer concave or convex surface with respect to the central rotor shaft.

5. The vertical axis wind turbine according to claim 1 wherein the connecting arm(s) are airfoil shaped.

6. The vertical axis wind turbine according to claim 1, wherein the length of the rotor shaft is equal to or less than the vertical distance between the top most airfoil cross section of the blade and the bottom most airfoil cross section.

7. The vertical axis wind turbine according to claim 1, which further comprises a rotor which has three blades and a vertical projection of said three blades forms a closed circle.

8. The vertical axis wind turbine according to claim 1, wherein the blade(s) comprises a mixture of fibre glass and/or carbon fiber with epoxide resin and/or high strength glass and/or plastic and/or foam and/or metal.

* * * * *